(12) United States Patent
El A'mma et al.

(10) Patent No.: US 9,212,402 B2
(45) Date of Patent: Dec. 15, 2015

(54) ALDEHYDE SCRUBBING IN CRUST LEATHER AND TANNED LEATHER

(75) Inventors: Anton G. El A'mma, Perkiomenville, PA (US); Robert W. Grich, North Wales, PA (US); Joseph M. Hoefler, Bensalem, PA (US); Kelley L. Klein, Reading, PA (US); Jill A. Ottinger, Roslyn, PA (US)

(73) Assignee: Rohm and Haas Company, Philadelphia, PA (US)

( * ) Notice: Subject to any disclaimer, the term of this patent is extended or adjusted under 35 U.S.C. 154(b) by 1571 days.

(21) Appl. No.: 12/584,760

(22) Filed: Sep. 11, 2009

(65) Prior Publication Data
US 2010/0068541 A1   Mar. 18, 2010

Related U.S. Application Data

(60) Provisional application No. 61/191,885, filed on Sep. 12, 2008.

(51) Int. Cl.
| | | |
|---|---|---|
| *C14C 11/00* | (2006.01) |
| *C08F 220/06* | (2006.01) |
| *C08K 5/31* | (2006.01) |
| *C09D 133/08* | (2006.01) |

(52) U.S. Cl.
CPC ............ *C14C 11/003* (2013.01); *C09D 133/08* (2013.01); *C08F 220/06* (2013.01); *C08K 5/31* (2013.01)

(58) Field of Classification Search
USPC ................ 427/323, 389; 428/423.4; 8/94.1 R
IPC .......... C14C 11/003; C08F 220/06; C08K 5/31; C09D 133/08
See application file for complete search history.

(56) References Cited

U.S. PATENT DOCUMENTS

| | | | | |
|---|---|---|---|---|
| 3,025,265 | A | * | 3/1962 | Maeder .......................... 525/153 |
| 4,250,070 | A | | 2/1981 | Ley et al. |
| 4,256,809 | A | | 3/1981 | Larsson et al. |
| 5,316,860 | A | | 5/1994 | Stewart et al. |
| 6,991,659 | B2 | | 1/2006 | Kittmer et al. |
| 7,851,545 | B2 | * | 12/2010 | Cobb ............................ 524/560 |
| 2004/0074009 | A1 | * | 4/2004 | Kittmer et al. ................. 8/94.15 |
| 2008/0027168 | A1 | | 1/2008 | Pajerski |

FOREIGN PATENT DOCUMENTS

| | | |
|---|---|---|
| EP | 1 674 515 A1 | 6/2006 |
| JP | 7228786 A2 | 8/1995 |
| JP | 2000217944 A | 8/2000 |
| JP | 2007204892 A2 | 8/2007 |
| WO | WO 2009/084237 A1 | 7/2009 |

* cited by examiner

*Primary Examiner* — Kevin R Kruer
(74) *Attorney, Agent, or Firm* — Andrew E. C. Merriam

(57) ABSTRACT

The present invention provides aqueous flesh coating compositions comprising one or more aqueous acid-functional acrylic or vinyl copolymer and from 0.03 and up to 1.0 equivalent, based on equivalents of carboxylic acid in the polymer, of one or more active compound chosen from an aminoguanidine, semicarbazide, dihydrazide, guanamine, hydrazine and a salt thereof. Further, the invention provides methods of applying the coating composition to leather crust or to tanned leather, and to the flesh coated leather or coated leather crust produced thereby. The leather crust and tanned leather produced by the invention, for example fleshcoated or finished leather, will emit greatly reduced levels of aldehydes over time and especially valuable in scrubbing aldehydes from perforated leather for automotive use.

10 Claims, No Drawings

ALDEHYDE SCRUBBING IN CRUST LEATHER AND TANNED LEATHER

This application claims the benefit of priority under 35 U.S.C. §119(e) of U.S. Provisional Patent Application No. 61/191,885 filed on Sep. 12, 2008.

The present invention relates to methods of reducing the level of aldehydes in leather crust and tanned leather, as well as the products made thereby, for example fleshcoated or finished leather. More particularly, it relates to aqueous flesh coating compositions comprising one or more aqueous acid-functional acrylic or vinyl polymer and one or more active compound chosen from an aminoguanidine, semicarbazide, dihydrazide, guanamine, hydrazine and any salt thereof, to methods of applying the coating to leather crust or to tanned leather, and to the flesh coated leather or coated leather crust produced thereby.

Increasingly, tanned and retanned leather crusts and finished leather goods made from those crusts contain excessive residual amounts of aldehydes, such as formaldehyde (FA) and acetaldehyde (ACHO). Limits for acetaldehyde have recently been established and specified by manufacturers and resellers of tanned leather and finished leather using various analytical methods to determine VOC content of finished leather. For example, tanneries have been compelled by their customers to limit aldehyde emissions from finished (coated) and tanned leather, especially for automotive use. In addition, Automotive OEMs and their tier suppliers have recently identified ACHO in leather products and have turned back responsibility for reducing acetaldehyde to their suppliers, i.e. tanneries, makers of retans, makers of coating materials and leather finishers. However, tanneries and suppliers of finished leather goods continue to struggle with locating the source of ACHO.

One source for generating FA and ACHO may be the heat applied to tanned and finished leather. Heating is a common means for drying crust and, thereafter for drying any finishing stages; and, because heat drying is inexpensive and efficient, it is unlikely that such heating can be eliminated.

Aldehyde-based vegetable or mineral free tanning agents and syntans comprise another source for generating FA or ACHO. One could eliminate this source of free aldehydes by continuing to use trivalent chromium containing tanning agents; however, this is not an ecologically responsible or sustainable solution.

Automotive OEMs have recently begun providing perforated leather upholstery, at least in part, to improve air circulation in the automobile. Perforated leather can continue to emit ACHO and FA after the automobile is sold or leased. There remains a need to eliminate the emissions of ACHO and FA from perforated leather upholstery. Moreover, there remains an on going need for less VOC emissions from finished leathers, and especially for less acetaldehyde (ACHO).

U.S. Pat. No. 6,991,659 B2, to Kittmer et al. proposes to treat leather with at least one hydrazine compound and with aldehyde-based tanning, stability or fastness improving agents in any desired sequence at any point during the processes of tanning, neutralizing, masking, filling, retanning, fatliquoring, dyeing, fixing and washing leather before it is finished. The Kittmer et al. process seeks to improve the yield of aldehyde based leather treating agents and to avoid decomposition of such agents into FA. However, Kittmer et al. proposes to use aldehydes rather than avoid them. Further, Kittmer et al. does nothing to prevent later decomposition of or emission of FA or ACHO from leather crust, tanned leather or finished leather.

The present Applicants have found that the leather itself may be a big source of FA and ACHO and, accordingly, seek to solve the problem of providing a method and a composition to control the release of ACHO and FA from tanned and finished leather products while in use, especially those products tanned or treated with materials sourced from a natural origin, such as vegetable extracts, and, even more especially, such products that are perforated for later use.

STATEMENT OF THE INVENTION

According to the present invention, aqueous flesh coating compositions comprise one or more acid-functional copolymer binder formed by the copolymerization of from 50 to 90 wt. % of one or more hydrophobic comonomer and from 10 wt. % to 50 wt. % of one or more copolymerizable hydrophilic acidic comonomer, and from 0.03 or more, for example, 0.05 or more, and up to 1.0 equivalent of one or more active compound chosen from an aminoguanidine, semicarbazide, dihydrazide, guanamine, and hydrazine, and a salt thereof, based on the total number of equivalents of carboxylic acid in the acid-functional copolymer binder, preferably, 0.08 or more, or up to 0.8 equivalents. The active salt is a salt of an active compound and an acid or an acid functional polymer or oligomer. Preferably, the active compound is an aminoguanidine salt, such as aminoguanidine bicarbonate or aminoguanidine acrylate (co)polymer or oligomer.

The total binder solids of the composition may range from 2 wt. % to 60 wt. % binder solids, preferably 5 wt. % binder solids or more, or, preferably, up to 40 wt. % binder solids, more preferably, 10 wt % or more, or, up to 25 wt. % binder solids, or 12.5 wt. % solids or higher. For example, a concentrate at 35 wt. % binder solids is dilutable in water for use as a flesh coating composition.

The composition preferably consists essentially of aqueous acid-functional acrylic polymers substantially free of materials ($\leq 2.0$ wt. % of the polymers) that break down to form acetaldehyde (ACHO) or formaldehyde (FA). Such binders are substantially free of polymerization residues of ethyl (meth)acrylate or methyl (meth)acrylate.

Preferably, the one or more active compound or salt is an aminoguanidine salt, such as aminoguanidine bicarbonate or a poly (aminoguanidine acrylate) polymer or copolymer.

The composition may further comprise one or more acid-functional polymeric dispersant.

In other embodiments, the present invention comprises methods for coating tanned leather or crust comprising wet end processing and drying to form tanned leather or crust, and then applying the aqueous flesh coating composition to the tanned leather or crust and drying. The aqueous flesh coating compositions may be applied as a flesh-coat applied to the russet as needed at any finishing stage through to a final treatment or as a pre-coat applied to the grain side of the tanned leather or crust, i.e. prior to finishing coatings, such as basecoats.

In yet another embodiment, the present invention provides tanned leather or crust treated with the aqueous flesh coating compositions of the present invention. The resulting flesh coated or pre-coated product is scrubbed such that that subsequent perforation of the crust after finishing does not alter the low level of ACHO being generated, i.e. the ACHO is effectively eliminated (or at least significantly reduced) from the entire finished leather. Preferably, the tanned leather or crust treated with the aqueous flesh coating compositions of the present invention is perforated, before, during or after the treatment.

All ranges recited are inclusive and combinable. For example, a proportion of 2.0 wt. % or more, and up to 60 wt. %, preferably 5.0 wt. % or more, or up to 40 wt. %, will include ranges of 2.0 wt. % or more to 60 wt. % or less, 5.0 wt. % or more to 60 wt. % or less, 40 wt. % or more to 60 wt. % or less, 2.0 wt. % or more to 40 wt. % or less, 5.0 wt. % or more to 40 wt. % or less, and 2.0 wt. % or more to 5.0 wt. %.

Unless otherwise indicated, all pressure units are standard pressure and all temperature units refer to room temperature.

All phrases comprising parenthesis denote either or both of the included parenthetical matter and its absence. For example, the phrase "(co)polymer" includes, in the alternative, polymer, copolymer and mixtures thereof.

As used herein, the term "acrylic polymer" refers to polymers comprising the polymerization product of acrylate and/or methacrylate monomers.

As used herein, the phrase "aqueous" includes water and mixtures comprising water and one or more water-miscible solvent.

As used herein, the phrase "based on the total weight of solids" or "based on total solids" refers to weight amounts in comparison to the weight of the total composition amount of polymer, surfactant, binder and any filler or pigment.

As used herein, unless otherwise indicated, the phrase "(co)polymer" includes, independently, copolymers, terpolymers, block copolymers, segmented copolymers, graft copolymers, and any mixture or combination thereof.

As used herein, the term "equivalent" refers to the amount of a specified active compound or salt that will react with one equivalent of carboxylic acid or aldehyde under specified use conditions, such as aminoguanidine cation, hydrazine cation, carbazine cation. For example, a dihydrazide has two hydrazine equivalents and so one equivalent of a dihydrazide compound or salt is about one-half of one mole of that compound or salt.

As used herein, the term "flesh coat" means a treatment applied to tanned hide or crust to bind the leather fiber bundles together and, if desired, to prevent the fibers from pulling through during perforation.

As used herein, the term "Glass transition temperature" or "Tg" means the temperature at or above which a glassy polymer will undergo segmental motion of the polymer chain. Unless otherwise indicated, the glass transition temperatures of a polymer are calculated using the Fox equation, *Bulletin of the American Physical Society* 1, 3 Page 123 (1956).

As used herein, the term "(meth)acrylate" means acrylate, methacrylate, and mixtures thereof and the term "(meth)acrylic" used herein means acrylic, methacrylic, and mixtures thereof.

As used herein, unless otherwise indicated, the phrase "molecular weight" for acrylic polymers refers to the weight average molecular weight of a polymer as measured by gel permeation chromatography (GPC) against a polyacrylic acid standard; for silicon containing polymers, unless otherwise indicated, the phrase "molecular weight" refers to the weight average molecular weight of a polymer as measured by gel permeation chromatography (GPC) against a polystyrene standard.

As used herein, the term "tanned leather" or "crust" refers to an animal hide or skin that has been preserved by treatment with a tanning agent, such as a salt of chrome, aluminum, zirconium, iron, or magnesium; or a suitable vegetable extract. Tanned leather may have been treated with any and all wet end leather treatments, whereas crust has merely been tanned.

As used herein, the phrase "wt. %" stands for weight percent.

The present inventors have discovered that coating tanned leather or crust with an aqueous acid-functional polymer and one or more active chosen from aminoguanidine, semicarbazide, dihydrazide, guanamine, or hydrazine compound, or salt thereof, will effectively scrub most or all of the acetaldehyde (ACHO) and at least some of the formaldehyde (FA) that would otherwise volatilize from the thus treated leather or crust. The aqueous acid-functional polymer of the present invention penetrates the leather crust; and this polymer enables incorporation of large amounts of actives, for example, 0.5 wt. % or more, and up to 5.0 wt. %, based on binder solids, and distribution of the active throughout the crust. Thus, the aqueous flesh coating compositions of the present invention effectively remove aldehydes from inside the leather or crust.

Suitable aminoguanidine, semicarbazide, dihydrazide, guanamine, or hydrazine compounds may include adipoyl dihydrazide, aryl guanamines, such as benzoguanamine or phenylguanamine, aryl hydrazines, and decanoyl guanamine. The coating composition may also include formaldehyde (FA) reactive agents to more effectively scrub FA from the crust or leather.

The active can be added into the compositions in the form of an active salt, e.g. bicarbonate salt (AGB) or HCl salt, or the salt can be made by adding the compound, e.g. AG or AGB, to aqueous compositions containing free, unneutralized acid, to achieve higher levels up to its saturation point in the aqueous medium via buffering. AGB or a bicarbonate of an aminoguanidine compound is one preferred active compound salt.

Suitable aminoguanidine, semicarbazide, dihydrazide, guanamine, or hydrazine salt compounds (active salts) are known compounds and may be produced by mixing e.g. aminoguanidine with one or more salt-forming acid or acid-functional polymer which may be the binder of the present invention, a polymer dispersant, or mixtures or combinations thereof. If commercially available, the one or more salt, e.g. AGB, may be added as a dry substance. Alternatively, the salt may be prepared in the form of aqueous solutions or dispersions of the salt forms, e.g. with a dry substance content in the range of 5 to 70 wt. % of the total aqueous mixture of the active compound or salt thereof, water, and dispersant. Active salts of strong acids, in particular of mineral acids (in particular, sulphuric acid, nitric acid, hydrochloric acid, phosphoric acid) or of sulphonic acids, may be produced by reacting e.g. aminoguanidine bicarbonate or the aminoguanidine salt of a low molecular carboxylic acid (preferably formic or acetic acid), with the respective mineral acid or sulphonic acid. The preferred AGB can be produced by mixing aminoguanidine and carbonic acid together in an aqueous medium.

Unsaturated acids or acid functional unsaturated monomers and their oligomers or polymers, such as acrylic acid, phosphoethyl (meth)acrylate, and oligomers or polymers thereof having 3 or more acid groups, may also be used to form water-insoluble to slightly water soluble active salt compounds, e.g. aminoguanidine acrylate (ester), polyacrylic acid hydrazide, and maleic hydrazide, or aminoguanidine phosphoethyl (meth)acrylate.

The polymer or polymer dispersant salts of active compounds, e.g. poly (aminoguanidine acrylate), may be made by mixing acid-functional polymer, such as polyacrylic acid or polymaleic acid, preferably in its acid form or less than 25% neutralized, with the aminoguanidine, semicarbazide, dihydrazide, guanamine, or hydrazine compound in an aqueous medium.

Aminoguanidine salts are preferred. Suitable aminoguanidine compounds may be chosen from aminoguanidine salts of mineral acids, such as aminoguanidine bicarbonate (AGB), $C_6$-$C_{12}$ carboxylic acid salts of aminoguanidine, aromatic carboxylic acid salts of aminoguanidine, unsaturated carboxylic acid salts of aminoguanidine, salts of aminoguanidine compounds with (co)polymers of unsaturated carboxylic acids, salts of aminoguanidine compounds with the aqueous acid-functional acrylic copolymer binder, any of the foregoing salts of $C_1$-$C_{18}$ alkyl substituted aminoguanidine and any of the foregoing salts of $C_6$-$C_{18}$ (alkyl)aryl substituted aminoguanidine.

Examples of other suitable aminoguanidine salt compounds may include, for example, aminoguanidine mono- or dihydrochloride, aminoguanidine hemisulphate or sulphate, aminoguanidine nitrate, aminoguanidine formate, aminoguanidine acetate, aminoguanidine 4-hydroxybenzenesulphonate, aminoguanidine naphthalene-1- or -2-sulphonateate, aminoguanidine 4-, 5- or 7-hydroxynaphthalene-1-sulphonate, aminoguanidine 1-, 6- or 7-hydroxynaphthalene-2-sulphonate, and aminoguanidine 4-toluolsulphonate. Preferably, the aminoguanidine salt compound is AGB, poly(aminoguanidine acrylate), poly(aminoguanidine acrylate)-co-cetyleicosyl methacrylate, and poly(aminoguanidine acrylate)-co-ethylhexyl acrylate.

To aid in dissolving or dispersing the active compound or salt thereof into the aqueous flesh coating compositions, one or more water-soluble polymer dispersant may be used in amounts ranging from 0.1 to 5 wt. %, preferably 0.2 wt. % or more, or 4 wt. % or less, and, more preferably, 0.5 wt. % or more, and 3 wt. % or less, or 1 to 2 wt. %, based on the weight of the active compound or salt.

Suitable polymer dispersants are any formed from at least one anionic monomer to form a water-soluble polymer. Suitable anionic monomers may include, for example, ethylenically unsaturated acid monomers, including, for example, ethylenically unsaturated carboxylic acid monomers, phosphorus acid monomers and sulfonic acid monomers. The polymer dispersants may additionally contain at least one polymerized unit from nonionic monomers. Some suitable nonionic monomers include, for example, ethylenically unsaturated nonionic compounds, including compounds with one or more double bond, such as olefins, substituted olefins (including, for example, vinyl halides and vinyl carboxylates), dienes, (meth)acrylates, substituted (meth)acrylates, (meth)acrylamide, substituted (meth)-acrylamides, styrene, substituted styrenes, and mixtures thereof. Further suitable water soluble polymers may be polycarboxy addition (co) polymers which contain at least two carboxylic acid groups, anhydride groups, or salts thereof. Ethylenically unsaturated carboxylic acids may range in amount from about 1% to 100%, by weight, based on the weight of the polymer dispersant.

Polymer dispersants may be made by any polymerization method, including, for example, solution polymerization, bulk polymerization, heterogeneous phase polymerization (including, for example, emulsion polymerization and suspension polymerization), and combinations thereof, as is known in the art. The molecular weight of such water soluble polymeric species may be controlled in a known fashion by the use of a chain regulator, for example, sulfur compounds, such as mercaptoethanol and dodecyl mercaptan. The molecular weight of the water soluble polymer is preferably from about 300 to about 100,000, or about 1,000 to 100,000, more preferably 1,000 to 20,000, or 2,000 to 20,000, and even more preferably from 2,000 to 8,000.

Many suitable commercial polymer dispersants are available and may be used as additives in neutralized form, such as with a base like $NH_4OH$. Suitable commercial dispersants include, for example, Tamol™, Orotan™, Acumer™ and Acusol™ dispersants, such as Oratan™ 731A, available from the Rohm and Haas Company (Philadelphia, Pa., USA).

In other embodiments, the aqueous flesh coating compositions may further comprise other water soluble components to scrub formaldehyde (FA) in addition to ACHO, for example, very water soluble compounds like ethylene urea and phenol, as well as aminoplasts and polyphenols.

The aqueous acid-functional copolymer binder of the present invention was selected because it is good at penetrating into the tanned leather or crust, it fixes onto the leather fibrils, and it positions the active compound or salt thereof in the best proximity for scrubbing the entire leather after it is fully finished. Further, the aqueous acid-functional copolymer binder should not generate ACHO or FA. To insure that the aqueous acid-functional polymer does not generate ACHO or FA, the composition should, for ACHO, not contain polymerization residues of ethyl (meth)acrylate in the backbone and, for FA, not contain polymerization residues of methyl (meth)acrylate in the backbone.

Suitable binders for the aqueous flesh coating compositions may comprise amphiphilic copolymers having a glass transition temperature of from –100° C. to 100° C. formed by the copolymerization of from 50 to 90 wt. % of one or more hydrophobic comonomer and from 10 wt. % to 50 wt. % of one or more copolymerizable hydrophilic acidic comonomer. Suitable hydrophilic monomers may be chosen from water soluble ethylenically unsaturated, preferably monoethylenically unsaturated, acidic monomers or mixtures thereof. Examples of suitable hydrophilic monomers include (meth) acrylic acid; itaconic acid; fumaric acid; maleic acid and anhydrides of such acids; acid substituted (meth)acrylates such as, for example, phosphoalkyl (meth)acrylates, including phosphoethyl methacrylate, sulfoethyl methacrylate; and acid substituted (meth)acrylamides such as, for example, 2-acrylamido-2-methylpropylsulfonic acid. Preferably, the water soluble hydrophilic monomer is methacrylic acid.

The nature hydrophilic monomer enables easy dispersability of the amphiphilic copolymer made therewith in an aqueous solution, and enables the copolymer to be prepared at high polymer solids at a handleable or shearable viscosity without adversely affecting the ability of the copolymer to penetrate leather and provide it with improved aesthetics, strength, temper, and water resistance.

Suitable hydrophobic comonomers are vinyl monomers and may be chosen from long chain alkyl(meth)acrylates, long chain alkoxy(polyethyleneoxide) (meth)acrylates, alkylphenoxy(polyethyleneoxide) (meth)acrylates, primary alkenes, and vinyl esters of long chain alkyl carboxylic acids, and mixtures thereof. Suitable hydrophobic monomers include $C_8$-$C_{22}$ alkyl (meth)acrylates, $C_8$-$C_{22}$ alkoxy or $C_6$-$C_{12}$ alkyl phenoxy(polyethylene oxide) (meth)acrylates; $C_{12}$-$C_{22}$ 1-alkenes, and vinyl esters of $C_{12}$-$C_{22}$ alkyl carboxylic acids. Examples of such hydrophobic monomers include dodecyl (meth)acrylate, ethylhexyl methacrylate, pentadecyl (meth)acrylate, cetyl (meth)acrylate, stearyl (meth)acrylate, eicosyl (meth)acrylate, isodecyl (meth)acrylate, vinyl stearate, nonylphenoxy(ethyleneoxide)$_{1-20}$ (meth)acrylate, octadecene, hexadecene, tetradecene, dodecene, and mixtures of any of the above. Preferably, the hydrophobic monomers found to provide the best water resistance, are of long chain ($C_{12}$-$C_{20}$) alkyl (meth)acrylates and mixtures thereof, such as mixtures of $C_{16}$-$C_{20}$ alkyl (meth)acrylates (referred to hereinafter as "CEMA" for cetyleicosyl methacrylate).

Minor amounts, of other ethylenically unsaturated copolymerizable monomers at concentrations equal to or less than 50 wt. % of the total hydrophobic comonomer concentration, may be used in combination with greater than 50 wt. % of at least one of the above hydrophobic monomers. Such suitable additional hydrophobic comonomers have been found to be useful as diluents for the other hydrophobic comonomers without adversely affecting the penetration of the flesh coating form thereby into the crust. Examples of such useful copolymerizable hydrophobic diluent comonomers include lower ($C_1$-$C_7$) alkyl (meth)acrylates, styrene, alpha-methylstyrene, vinylacetate, (meth)acrylonitrile and olefins.

The amphiphilic copolymers of the present invention may be prepared by the copolymerization of the hydrophilic and hydrophobic monomers by any conventional technique. Such techniques may include, for example, polymerization in a water miscible alcohol such as, tert butanol or butyl Cellosolve™ (Dow Chemical Company, Midland, Mich., USA) using a water insoluble free radical initiator at a concentration of from 0.2 wt. % to 5 wt. % on total monomers. Examples of suitable free radical initiators which may be used include peresters and azo compounds. The polymerization may preferably be conducted at a temperature of from 50° C. to 150° C., preferably at a temperature of 70° C. to 100° C. Chain transfer agents such as mercaptans, may optionally be used to control molecular weight. Polymerization may be conducted by polymerizing all monomers together or by gradual addition of monomers and initiator over a period of from 1 to 6 hours until polymerization is essentially complete (greater than about 98% conversion). The polymerization produces a concentration of amphiphilic polymer solids in solvent of from as low as about 20% solids to as high about as 75% solids with a Brookfield viscosity of from about 100 to about 1,000,000 Cps at room temperature.

Copolymers formed using olefinic hydrophobic monomers may be prepared according to known methods.

The aqueous flesh coating compositions may further include additives, including without limitation, binder copolymers, surfactants, pigments, e.g. aqueous silica dispersions, extenders, flatting agents, e.g. acrylic copolymeric duller beads or silica, dyes, pearlescents, adhesion promoters, crosslinkers, other dispersants, defoamers, dispersants, such as anionic polymeric dispersing agents, wetting agents, optical brighteners, ultraviolet stabilizers, coalescents, rheology modifiers, preservatives, biocides, and antioxidants. Preferably, the compositions are free of any additives that decompose or break down to generate formaldehyde or acetaldehyde and should exclude any nonionic surfactant, e.g. nonionic surfactants and silicon containing polyethers that contains ethylene oxide, methylene oxide, ethyl ether or methyl ether functions. Such compositions consist essentially of additives that do not so decompose or break down.

The aqueous flesh coating compositions may be made by simple mixing, in any order, active compound, or salt thereof as a powder, aqueous acid-functional polymer and any polymer dispersant. Where the active compound is not in salt form, it may be pre-mixed with acid for a period of time, e.g. 60 seconds to 48 hours, to form the salt before adding it to the composition. Alternatively, the active compound when not in salt form may be mixed with at least partially unneutralized aqueous acid-functional polymer and/or acid-functional polymer dispersant for a period of time to form the salt, followed by mixing in the remainder of the composition.

The aqueous compositions are storage stable and can be applied to any substrate either "as is" or in combination or admixture with one or more other ingredients, such as binder copolymers.

The methods of the present invention comprise applying aqueous flesh coating compositions to tanned leather or leather crust at any time after wet end processing is complete. Because the aqueous flesh coating compositions actually penetrate the leather or crust substrate and remove ACHO and FA therefrom, they need not be the last coating applied and need not be applied on all sides of the substrate. The aqueous flesh coating compositions can be applied as pre-coats applied prior to a basecoat on the grain side of the crust or tanned leather or as flesh-coat coatings applied to the russet or back side of the crust or tanned leather at any finishing stage through to a final treatment.

Aqueous flesh coating compositions may be applied onto the tanned leather by various methods such as spraying, roll coating, and hand swabbing. After contacting the leather with the aqueous flesh coating composition, the treated leather is dried or allowed to dry.

EXAMPLES

"Bag Test" Method Summary and Details: 8×10 cm leather samples were placed in sealed Tedlar™, polyvinylfluoride (PVF) film bags DuPont (Wilmington, Del.). The bags were purged (3×(8 liters $N_2$ for 30 minutes at 80° C.)) prior to testing leather. The bags were then filled with 4 L of nitrogen, heated at 65° C., for 2 hours and then evacuated with vacuum through inline glass tubes containing silica gel coated with 2,4-dinitrophenylhydrazine (DNPH) (SKC, Inc., Eighty Four, Pa., USA (SKC catalog #226-119)) aldehyde cartridges attached so that the long bed (300 mg analysis bed) of the cartridge faced the bag. DNPH forms an adduct with each of formaldehyde and with acetaldehyde. Each cartridge was removed, capped, and placed in a freezer to preserve the DNPH-ACHO or DNPH-FA adduct until analysis, and then was allowed to come to room temperature before analysis.

To perform the analysis, the DNPH coated silica beds were removed from each cartridge using Supelco Puller/Inserter tool (cat#2-2406) (Supelco, Bellefonte, Pa., USA), and placed in 4 mL vials. Then, to extract using a digital pipet, 2.5 mL of Fisher Scientific Optima® LC/MS grade acetonitrile (ACN) was added to each vial, and the vials were sonicated for 30 minutes, followed by filtering the extract into a 3 mL syringe with a 10 mm Whatman, Inc. Florham Park, N.J., USA Anotop 10 0.2 µm syringe filter, and injecting 1.5 mL from the syringe into an autosampler vial. The extract was analyzed by HPLC at 360 nm. Duplicate injections were performed for each sample.

The concentrations of formaldehyde and acetaldehyde derivatives were determined using DNPH derivative HPLC method (below), based on serially diluted standards of acetaldehyde-DNPH and formaldehyde-DNPH in ACN.

High Pressure Liquid Chromatography (HPLC) Method:

HPLC was performed on a 10 µL sample of the extract described above at 30° C. and a flow rate of 1 mL/min using an Agilent HP1100 with VWD UV device (Agilent Technologies, Santa Clara, Calif., USA) equipped with a Phenomenex Synergi MAX-RP, 4 µm, 4.6 mm×250 mm (Phenomenex, Torrance, Calif., USA) column. Eluted through the column (the Mobile Phase) was a mixture of 60 ACN/40 water by volume. The UV Detector was set at a 360 nm wavelength.

The concentration of the aldehyde in extract is determined from the calibration curve equation.

Examples 1 and 2

The mixtures shown in Table 1, below, are designed to scrub aldehydes from full grain crust tanned with a Chrome metal salt containing tanning agent. AGB was mixed with aqueous acid-functional acrylic copolymer binder and water to create a flesh coat. Each mixture was sprayed on the flesh side of leather crust at 53.8 g/m² (5 g/sq ft) of wet product. Leather was then dried for a minute in 85° C. oven, and equilibrated before being tested by Analytical using R&H's "bag test".

TABLE 1

| | Formulations | | | |
|---|---|---|---|---|
| EXAMPLE | Resin | Resin (g) | Water (g) | Scrubber |
| 1-1 | Acrylic polymer A (68EA/22BA/10AA) | 54 | 45 | 1 g AGB |
| 1-2 | Acrylic polymer B (70EHA/30MAA, mw 5,000) | 35 | 64 | 1 g AGB |
| 1-3 | Polymer C (95EA/5IA) | 35 | 64 | 1 g AGB |
| 2-1 | Acrylic polymer B | 350 | 650 | 10 g AGB |
| 2-2 | Acrylic polymer B | 350 | 650 | 20 g AGB |
| 2-3 | Acrylic polymer B | 350 | 650 | 0 g AGB |

EHA = ethylhexyl acrylate; MAA = methacrylic acid; EA = ethyl acrylate; BA = butyl acrylate; AA = acrylic acid; IA = itaconic acid.

The pH of the acrylic polymer B was 5.2. The pH of Example 2-2 was pH 6.4.

TABLE 2

| | Results from the Bag Test | |
|---|---|---|
| Example | ug formaldehyde | ug acetaldehyde |
| leather crust blank | 0.06 | 2.22 |
| 1-1 | 0.08 | 2.79 |
| 1-2 | 0.03 | 1.67 |
| 1-3 | 0.09 | 3.97 |
| leather crust blank | 0.13 | 3.35 |
| 2-1 | 0.09 | 5.06 |
| 2-2 | 0.06 | 0.94 |
| 2-3 | 0.13 | 6.1 |

As shown above in Table 2, above, AGB at about 0.12 equivalents aminoguanidine cation/equivalent COOH effectively removes from 30% to over 80% of the acetaldehyde and removes about half of the formaldehyde from leather crust. In comparison, the aqueous flesh coating compositions comprising acrylic polymer A and acrylic polymer C actually increased the amount of acetaldehyde and formaldehyde released from the leather crust.

Example 3

In Examples 3-1, 3-2, 3-3, and 3-4, all substrates were the same full grain leather crusts tanned with a Chrome metal salt, top coated with a polyurethane dispersion finish, and then fleshcoated as indicated in Table 3, below. To make the fleshcoat, all of the treated substrates were sprayed on the uncoated flesh side with the composition of Example 2-2. As Table 3 shows, the substrate in Example 3-4 was treated with an acetaldehyde scavenger that had the side effect of generating formaldehyde in the crust.

TABLE 3

| | Effectiveness in Finished Leather Substrates | | |
|---|---|---|---|
| Example | Crust | ug formaldehyde | ug acetaldehyde |
| 3-1-a comparative | Untreated | 0.37 | 1.83 |
| 3-1-b | Fleshcoated as in Example 2-2 | 0.20 | 0.35 |
| 3-2-a comparative | Untreated | 0.36 | 1.04 |
| 3-2-b | Fleshcoated as in Example 2-2 | 0.16 | 0.20 |
| 3-3-a comparative | Untreated | 0.16 | 1.61 |
| 3-3-b | Fleshcoated as in Example 2-2 | 0.13 | 0.48 |
| 3-4-a comparative | Untreated | 1.59 | 0.37 |
| 3-4-b | Fleshcoated as in Example 2-2 | 1.32 | 0.32 |

As shown in Table 3, above, the aqueous flesh coating compositions comprising AGB remove from nearly 20% to over 80% of the acetaldehyde and from nearly 20% to just over half of the formaldehyde from a variety of treated leather crust. Even in Example 3-4, where acetaldehyde was pre-scavenged, the flesh coat remained effective to remove both FA and ACHO to a lesser degree.

Example 4

Effectiveness in Perforated Leather Crusts

In Examples 4-1, 4-2, and 4-3, all substrates were the same full grain leather crusts tanned with a Chrome metal salt, top coated with a polyurethane dispersion finish, and then flesh-coated on the uncoated flesh side with 1.5 wt. % AGB (0.09 equiv/equiv COOH) in Acrylic polymer B (35 wt. % solids) as indicated in Table 4, below. To make the fleshcoat, all of the treated substrates were sprayed on the uncoated flesh side with the fleshcoat composition. Prior to testing, perforations through the leather were made by a machine with hollow needles to yield a grid of 1 mm holes spaced 9 mm apart. The needles form a grid pattern.

TABLE 4

| | Bag Test Results for Perforated and Unperforated Leather | | |
|---|---|---|---|
| Example | Crust | ug formaldehyde | ug acetaldehyde |
| 4-1 comparative | Untreated | 0.23 | 0.87 |
| 4-2 | Fleshcoated | 0.13 | 0.24 |
| 4-3 | Fleshcoated, then perforated | 0.08 | 0.36 |

As shown in Table 4, above, the fleshcoating of the present invention removes FA as effectively from perforated leather as it does from unperforated leather. Further, in the example 4-3 shown, the fleshcoating removes ACHO around 80% as well from perforated leather as it does from unperforated leather. This example provides evidence that the fleshcoating penetrates the leather to remove formaldehyde from inside the leather crust.

Example 5

Various Salts of Aminoquanidine

In Examples 5-1, 5-2, 5-3, 5-4, and 5-5, all substrates were the same full grain leather crusts tanned with a Chrome metal salt, and were top coated with a polyurethane dispersion finish. The substrates in Examples 5-2, 5-3, 5-4, and 5-5 were then fleshcoated on the uncoated flesh side with formulation indicated in Table 5, below. To make the fleshcoat, all of the treated substrates were sprayed on the uncoated flesh side with the fleshcoat composition. In Example 5-2, the AGB was added to make a slurry, and shaken immediately prior to spraying. In Example 5-3, 2 wt. % of AGB was added and any AGB powder was filtered out at the bottom of a flask, such that only the liquid was used for the flesh coat. The number of equivalents of aminoguanidine cation/equivalent COOH in Example 5-2 is 0.12; and the number of equivalents of aminoguanidine cation/equivalent COOH in each of Examples 5-3 and 5-5 is 0.09.

TABLE 5

| EXAMPLE | Crust | ug formaldehyde | ug acetaldehyde |
|---|---|---|---|
| 5-1 (comparative) | Untreated | 0.16 | 4.47 |
| 5-2 | 2 wt. % AGB in water | 0.13 | 1.42 |
| 5-3 | 1.5 wt. % AGB w/ Acrylic Polymer B | 0.14 | 0.83 |
| 5-4 | ~1.8 wt. % AGB w/ Acrylic Polymer B | 0.10 | 0.68 |
| 5-5 | 1.2 wt. % AGHCl w/ Acrylic Polymer B | 0.13 | 0.86 |

As shown in Table 5, above, the hydrochloride and bicarbonate salts of aminoguanidine cation, respectively, in Examples 5-5 and 5-3 function equally well in relation to the concentration of aminoguanidine used therein. Further, the results in Example 5-4 function better as the concentration of aminoguanidine cation is increased. Accordingly, it is the aminoguanidine cation that scrubs to remove aldehydes.

We claim:

1. An aqueous flesh coating composition comprising one or more acid-functional copolymer binder formed by the copolymerization of from 50 to 90 wt. % of one or more hydrophobic comonomer and from 10 wt. % to 50 wt. % of one or more copolymerizable hydrophilic acidic comonomer, and from 0.03 or more, and up to 1.0 equivalent of one or more active compound chosen from an aminoguanidine, semicarbazide, dihydrazide, guanamine, hydrazine, and a salt thereof, based on the total number of equivalents of carboxylic acid in the acid-functional copolymer binder.

2. The composition as claimed in claim 1, wherein the composition comprises 0.08 or more equivalents of one or more active compound or salt thereof, based on the total number of equivalents of carboxylic acid in the acid-functional copolymer binder.

3. The composition as claimed in claim 1, wherein the active compound is a salt that is the salt of an acid or an acid functional polymer or oligomer.

4. The composition as claimed in claim 3, wherein the active salt is aminoguanidine bicarbonate or aminoguanidine acrylate (co)polymer or oligomer.

5. The composition as claimed in claim 1, further comprising one or more acid-functional polymeric dispersant.

6. A method for coating tanned leather or crust comprising wet end processing and drying leather to form tanned leather or crust, and then applying an aqueous flesh coating composition comprising one or more aqueous acid-functional polymer and one or more active compound for scrubbing leather chosen from aminoguanidine, semicarbazide, guanamine, and any salt thereof to the tanned leather or crust, and drying.

7. The method as claimed in claim 6, wherein the aqueous flesh coating composition is applied as a flesh-coat applied to the tanned leather or crust at any finishing stage through to a final treatment or as a pre-coat applied to the grain side of tanned leather or crust.

8. A leather or crust treated as claimed in claim 6 which comprises the active compound while in use.

9. The leather or crust as claimed in claim 8 wherein active compound is chosen from aminoguanidine and any salt thereof.

10. The leather or crust as claimed in claim 8 which is perforated.

* * * * *